US006277178B1

(12) United States Patent
Holmquist-Brown et al.

(10) Patent No.: US 6,277,178 B1
(45) **Date of Patent: *Aug. 21, 2001**

(54) RESPIRATOR AND FILTER CARTRIDGE

(75) Inventors: Thomas W. Holmquist-Brown, St. Paul; Peter O. Rekow, Woodbury, both of MN (US)

(73) Assignee: 3M Innovative Properties Company, St. Paul, MN (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/375,681

(22) Filed: Jan. 20, 1995

(51) Int. Cl.[7] .................................................... B01D 53/04

(52) U.S. Cl. ....................... 96/135; 96/153; 55/DIG. 33; 128/206.12; 128/206.17; 128/206.28

(58) Field of Search ......................... 55/DIG. 33; 96/108, 96/134–139, 153, 154; 128/201.25, 205.29, 206.12, 206.17, 206.28

(56) References Cited

U.S. PATENT DOCUMENTS

| | | | | |
|---|---|---|---|---|
| 2,100,051 | * | 11/1937 | Hallner | 96/108 X |
| 2,139,137 | * | 12/1938 | Schwartz | 128/206.17 |
| 2,526,782 | * | 10/1950 | Thorpe | 96/138 |
| 2,577,606 | * | 12/1951 | Conley | 96/134 |
| 2,664,887 | * | 1/1954 | Green | 128/206.17 |
| 2,744,523 | * | 5/1956 | Malcom, Jr. et al. | 128/206.17 |
| 2,744,524 | * | 5/1956 | Whipple | 128/206.17 |
| 2,744,525 | * | 5/1956 | Whipple | 128/206.17 X |
| 2,804,936 | | 9/1957 | Stampe . | |
| 3,072,119 | | 1/1963 | Matheson | 128/146 |
| 3,217,715 | * | 11/1965 | Berger et al. | 96/135 X |
| 3,545,622 | * | 12/1970 | Sakhnovsky et al. | 96/153 X |
| 3,721,072 | * | 3/1973 | Clapham | 96/153 |
| 3,971,373 | * | 7/1976 | Braun | 428/328 X |
| 4,013,566 | * | 3/1977 | Taylor | 96/153 X |
| 4,046,939 | * | 9/1977 | Hart | 428/311 |
| 4,098,270 | * | 7/1978 | Dolby | 128/206.12 |
| 4,543,112 | | 9/1985 | Ackley et al. | 55/316 |
| 4,714,486 | * | 12/1987 | Silverthorn | 96/134 |
| 4,790,306 | | 12/1988 | Braun et al. | 128/206.12 |
| 4,850,346 | | 7/1989 | Michel et al. | 128/206.15 |
| 4,906,263 | * | 3/1990 | von Blücher et al. | 96/135 |
| 4,908,132 | * | 3/1990 | Koval et al. | 96/137 X |
| 4,921,512 | * | 5/1990 | Marryanek et al. | 96/134 X |
| 4,992,084 | * | 2/1991 | von Blücher et al. | 96/135 X |
| 5,022,901 | * | 6/1991 | Meunier | 96/134 |
| 5,033,465 | | 7/1991 | Braun et al. | 128/205.27 |
| 5,062,421 | * | 11/1991 | Burns et al. | 128/205.27 |
| 5,063,926 | | 11/1991 | Forsgren et al. | 128/206.17 |
| 5,078,132 | | 1/1992 | Braun et al. | 128/206.12 |
| 5,148,803 | * | 9/1992 | Scholbohm | 128/206.17 X |
| 5,158,077 | * | 10/1992 | Sundström | 96/134 X |
| 5,222,488 | | 6/1993 | Forsgren | 128/201.25 |

FOREIGN PATENT DOCUMENTS

| | | |
|---|---|---|
| 6 752 895 | 9/1968 | (DE) . |
| 0218348 | 4/1987 | (EP) . |
| 2 235 710 | 1/1975 | (FR) . |

OTHER PUBLICATIONS

Half–And Full–Facepiece Twin Cartridge Respirators product literature from Scott Aviation, a Figgie International Company, 8/93.

Easi–Air™ Dual Cartridge Respirators product literature from 3M, 1986.

* cited by examiner

*Primary Examiner*—Robert H. Spitzer
(74) *Attorney, Agent, or Firm*—Karl G. Hanson

(57) ABSTRACT

A respirator (10) includes a filter cartridge (12) that has a housing (16) and a bonded sorbent filter element (20). Housing (16) includes a sleeve (32) that has an inner surface (36) and a folded edge (42). The filter element (18) includes a bonded sorbent filter element (20) that is pressed against the sleeve's inner surface (36) and that is held in the sleeve (32) by the folded edge (42).

16 Claims, 1 Drawing Sheet

RESPIRATOR AND FILTER CARTRIDGE

TECHNICAL FIELD

This invention pertains to respirators and filter cartridges that protect against gases or vapors and that have a bonded sorbent filter element, a sleeve that houses the filter element, and a folded edge of the sleeve retaining the filter element in position.

BACKGROUND OF THE INVENTION

Sorbent particles such as activated carbon are commonly used in respirators as gas or vapor filters. The filters generally are classified according to the manner in which the sorbent material is supported in the filter and include packed bed filters, loaded nonwoven filters, loaded foam filters, and bonded sorbent filters.

In packed bed filters, the sorbent particles are constrained in a container by compressive forces imposed on and transmitted through the particle bed by rigid grids and screens that cover the inlet and outlet areas. Virtually all packed bed filters are cylindrical, have constant thickness or bed depth, and have a planar inlet and outlet. To fill the cartridge, the adsorbent particles typically are poured through screens that scatter the particles as they fall, creating a level bed packed substantially to maximum density. The compressive forces from the constraining grids and screens restrain particle movement to minimize flow channeling through the packed bed.

An example of a packed bed filter is shown in U.S. Pat. No. 4,543,112. This patent discloses a sorbent filter assembly made by sequentially placing a first resilient perforated plate, a first retention filter, a sorbent bed, a second retention filter, a second resilient perforated plate, and a cover within the cylindrical portion of a canister shell. The cover is forced downwardly to compress the sorbent bed and to resiliently spring bias or stress the first resilient perforated plate. While the parts are held together under compression, an annular edge portion of the cylindrical shell is rolled into a circumferentially extending groove on the canister cover to hermetically seal and mechanically hold the parts together in their assembled and compressed relationship.

The necessity for this number of parts and processing steps introduces complexity as well as weight, bulk, and cost. A further problem is experienced when a packed bed respirator is combined in series with a particulate filter for use in environments containing particulates as well as vapor hazards such as in paint spray applications. In this situation, the retaining grids and screens create nonuniform airflow pathways within the particulate filter resulting in reduced utilization of the filter media and increased pressure drop therethrough.

Loaded nonwoven webs have been disclosed that contain sorbent particles in the interstices between the fibers forming the web. An example is shown in U.S. Pat. No. 3,971,373. Loaded foams also have been disclosed that contain adsorbent particles dispersed within and bonded in the foam structure. U.S. Pat. No. 4,046,939 describes a carbon impregnated foam for protective clothing against noxious chemicals. Both loaded nonwoven webs and loaded foam structures must be edge sealed to the respirator component to prevent unfiltered air from bypassing the filter. Known sealing means include adhesives, such as disclosed in U.S. Pat. No. 5,063,926, and gaskets or sealing rings, such as disclosed in U.S. Pat. No. 5,222,488. Loaded structures generally suffer from having a lower sorbent particle density than the packed beds.

A significant advance over the packed beds technology and loaded webs and foams was the invention of bonded sorbents. In bonded sorbent technology, the sorbent particles are molded into a unitary structure using polymer particles that bind the sorbent particles together. Bonded sorbent structures eliminate the need for additional supporting structures, as are necessary in packed beds. An example of a bonded sorbent structure is disclosed in U.S. Pat. No. 5,033,465. Bonded sorbent structures have been sealed to the respirator using an adhesive—see, for example, U.S. Pat. No. 5,078,132; or by injection molding—see, for example, U.S. Pat. No. 4,790,306. The filter elements in these respirators are not able to be readily replaced, and thus when the filter's service life has met its limit, the respirator is discarded as waste.

SUMMARY OF THE INVENTION

The present invention provides a new filter cartridge and a new respirator that overcome some of the disadvantages of known respirators and filter cartridges.

Briefly, the filter cartridge of the invention comprises:

(a) a housing that includes a sleeve that has an inner surface and has a folded edge extending from the sleeve; and (b) a filter element that includes a bonded sorbent filter element, the filter element being pressed against the sleeve's inner surface to form an interference therewith and is held in the sleeve by the folded edge. The respirator of the invention, in brief summary, comprises a respirator face piece and the filter cartridge summarized above.

The filter cartridge and respirator of the invention have a bonded sorbent filter element, a sleeve housing the filter element, and a folded edge of the sleeve retaining the filter element in position. The interface between the bonded sorbent filter element and the housing sleeve prevents channeling (that is, passage of unfiltered air around the filter element) by having the filter element compressed at the interface with the sleeve. When air passes through the filter element in channels, it avoids contact with the sorbent particles, causing a premature break-through of contaminants. The sleeve may be provided with an annular groove of decreased wall thickness that defines a fold line for forming a folded edge. When the sleeve is folded radially inward at the fold line, the resulting folded edge holds the filter element in position in the sleeve. Optionally, a particulate filter may be juxtaposed against the bonded sorbent filter element before the sleeve is folded.

Filter cartridges and respirators of this invention contain few components and can be assembled with relatively few manufacturing steps. The sleeve, which can be easily and inexpensively injection molded in essentially a single step, can provide a housing for the filter element, a sealing means for ensuring that all inhaled air passes through the filter element, and a retaining means for securing the filter element to the housing. The result is a filter cartridge and a respirator that are relatively light in weight, possess minimal parts, and are relatively easy to manufacture.

These and other advantages of the invention are more fully shown and described in the drawings and detailed description of this invention, where like reference numerals are used to represent similar parts. It is to be understood, however, that the drawings and description are for the purposes of illustration only and should not be read in a manner that would unduly limit the scope of this invention.

DETAILED DESCRIPTION OF THE PREFERRED EMBODIMENTS

Figure 1:
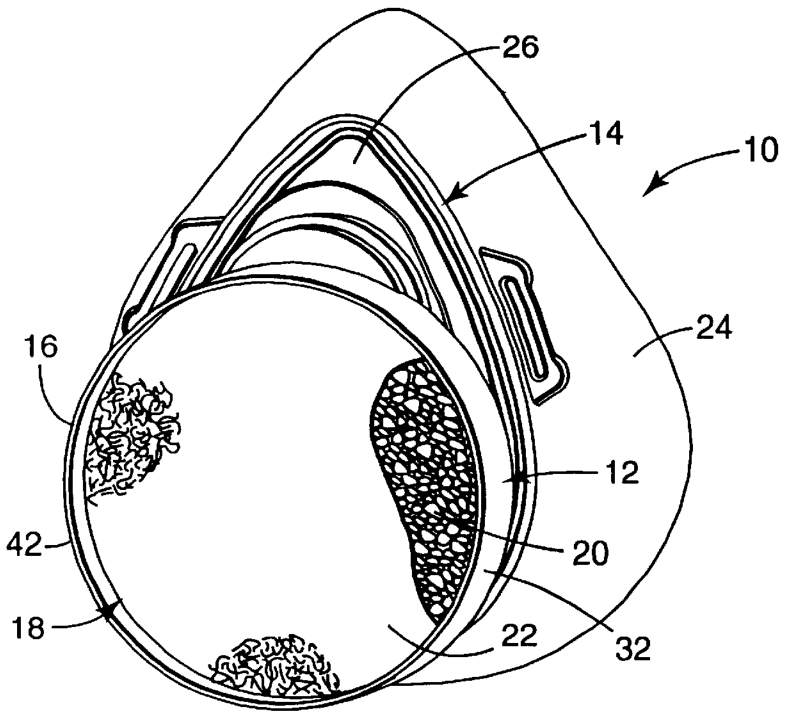
FIG. 1 is a perspective view of a respirator 10 in accordance with the invention.

FIG. 1 illustrates an example of a respirator 10 of the invention. Respirator 10 includes a filter cartridge 12 and a face piece 14. The filter cartridge includes a housing 16 and a filter element 18. The housing 16 is sized and shaped so that the filter element is slightly compressed when disposed in housing 16. Filter element 18 includes a bonded sorbent filter element 20 and optionally a particulate filter 22. As the term is used herein, "bonded sorbent filter element" means a body that includes sorbent granules bonded together by polymeric binder particles to form a rigid porous structure capable of sorbing gaseous contaminants that pass through the filter element. As shown, the particulate filter 22 preferably is disposed on the upstream side of bonded sorbent filter element 20 to prevent particulates from plugging the sorbent filter element's pores.

Face piece 14 is sized to fit over the nose and mouth of a person. A face piece conceivably could be provided that fits over other portions of a person's face (namely, the eyes), such as in a full face configuration; however, the face piece, as illustrated here, typically is fashioned in a half-mask configuration—that is, one that fits only over the nose and mouth. As shown, face piece 14 may comprise a soft, compliant portion 24 molded in sealing engagement about a rigid central portion 26. Rigid central portion 26 includes an inflow aperture (not shown) through which filtered air travels to enter the respirator's interior. Exhaled air can pass through an exhalation valve (not shown) in face piece 14. Respirators having soft, compliant facial portions and rigid central sections onto which the filter cartridge(s) are mounted are known in the art as shown in U.S. Pat. No. 5,062,421 to Burns and Reischel.

Figure 2:
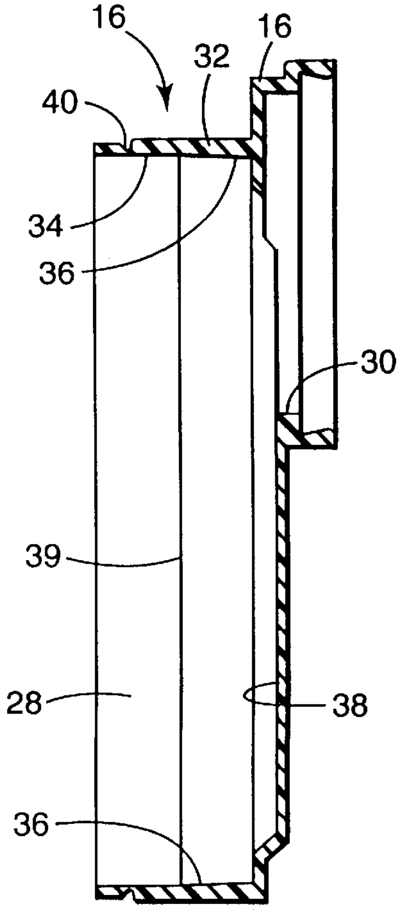
FIG. 2 is a cross-sectional view of a filter housing 16 in accordance with the invention.
Figure 3:
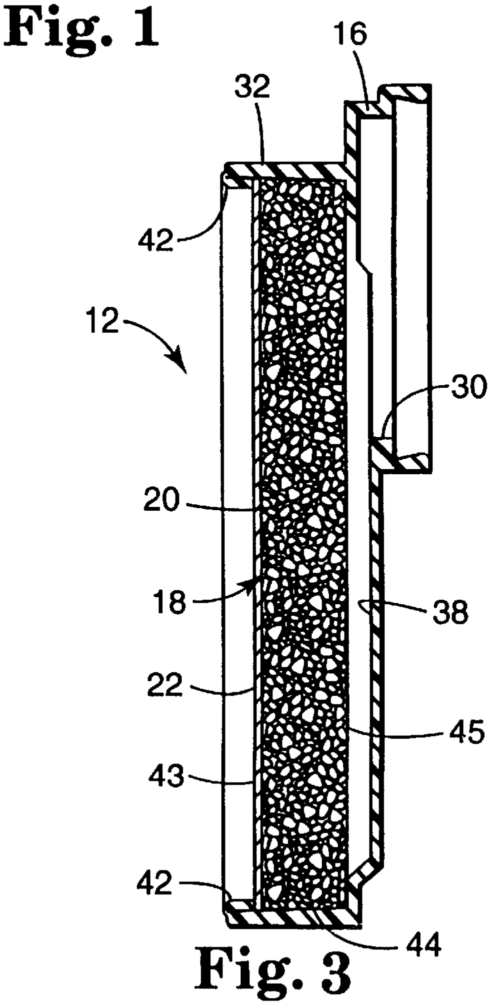
FIG. 3 is a cross-sectional view of a filter cartridge 12 having a bonded sorbent filter element 20 secured therein by a folded edge 42 in accordance with the invention.

FIG. 2 illustrates a filter housing 16 that is useful for forming a filter cartridge 12 (FIGS. 1 and 3). Filter housing 16 includes an inflow aperture 28, a sleeve 32 that is shown here in a pre-assembled condition. Air that is filtered passes from inflow aperture 28 through the filter element and then exits the cartridge through outflow aperture 30. Sleeve 32 preferably is fashioned to have a diameter at an end 34 (that defines the inflow aperture 28), which diameter is slightly larger than the diameter of the bonded sorbent filter element 20 (FIGS. 1 and 3) to facilitate inserting the filter element into the sleeve 32. Sleeve's inner surface 36 is slightly tapered, decreasing in diameter along a line that proceeds axially towards the housing's base or rear surface 38. The taper is shown to begin in FIG. 2 at line 39. The sleeve's inside diameter at some point in proceeding toward axially rear surface 38 preferably is slightly less than the outside diameter of the bonded sorbent filter element 20. Pressing a filter element into the tapered sleeve 32 therefore causes the filter element to slightly compress and to provide an interference fit between the filter element and the sleeve.

An annular groove 40 of decreased wall thickness may be provided in sleeve 32 to define a fold line.

As illustrated in FIG. 3, the fold line is positioned in the sleeve 32 so that when the bonded filter element 18 is press fit into position and the sleeve wall is folded radially inward, the folded edge 42 fits snugly against the inflow surface 43 of filter element 18, holding it firmly in place. The filter element 18 has a generally cylindrical configuration with the inflow surface 43 and outflow surface 45 separated by a peripheral surface 44. The amount of the taper on the sleeve's inner surface 36 (FIG. 2) preferably is large enough to allow the bonded sorbent filter element to be easily inserted, and yet is small enough to enable an interference fit to be formed with the sleeve over a substantial portion of the peripheral surface 44 of filter element 18. This prevents unfiltered air from entering the wearer's breathing track and also can prevent the filter element from becoming dislodged during assembly. A draft of 0.5 to 5 degrees has been found to be a satisfactory taper. A satisfactory sleeve inner diameter at the housing base preferably is approximately 0.1 to 1.3 millimeters (mm) less than the diameter of the filter element, and more preferably is about 0.4 mm less than the diameter of the filter element. Stated another way, the circumference of the sleeve at its base preferably is about 0.1 to 1.7 percent less than the circumference of the bonded sorbent filter element. The thickness of the sleeve 32 at the groove 40 is small enough to allow the sleeve to be folded 180° and large enough that it will not break or tear during the folding operation. A thickness of about 0.2 to 0.7 millimeters has been found to be satisfactory.

The sleeve preferably is made of a resilient material, such as a resilient plastic, that is capable of being folded along a groove of reduced thickness without breaking. The material also preferably is stiff enough to maintain its position along the inside wall of the sleeve. It has been found that materials having a flexural modulus of $2\times10^8$ to $30\times10^8$ pascals at 22° C. (73° F.) are satisfactory. The sleeve material preferably has a flexural modulus of $6\times10^8$ to $15\times10^8$ pascals at 22° C. The material also preferably is thermoplastic to facilitate fabrication. Some suitable materials are polyethylene, polypropylene, and thermoplastic rubbers. Low density polyethylene, such as Dowlex™ 2553 polyethylene (Dow Chemical Company, Midland, Mich.) which has a flexural modulus of $6.5\times10^8$ pascals (95,000 psi), is a particularly suitable material. Another suitable material is Dow 8454, a high-density polyethylene, having a flexural modulus of $9.7\times10^8$ pascals (140,000 psi). The sleeve preferably is formed by injection molding.

A bonded sorbent filter may be made of sorbent granules or particles that have been unified into a rigid, porous, self-sustaining, unitary, impact-resistant body by adherent binder particles. The sorbent granules are substantially uniformly distributed throughout the bonded sorbent structure and are spaced to permit a fluid to flow therethrough. The sorbent granules can be, for example, activated carbon, alumina, silica gel, bentonite, diatomaceous earth, ion exchange resins, powdered zeolites (both natural and synthetic), molecular sieves, and catalytic particles, and the polymeric binder particles can be, for example, polyurethane, ethylene, or vinyl acetate, or polyethylene. U.S. Pat. No. 5,033,465 to Braun and Rekow describes the selection of suitable binders and the preparation of suitable bonded sorbent structures. The disclosure of this patent is incorporated here by reference.

Optionally, a filter for dust or other particulates may be juxtapositioned on the bonded sorbent filter element's upstream surface before the folded edge is formed. The combination particulate and bonded sorbent filter is particularly useful in environments where there would be both gas or vapor and particulate contamination, for example, environments containing paint spray or pesticide spray. The particulate filter preferably has a size that is slightly larger than the inside dimensions of the sleeve so that when the sleeve is folded, it will trap the edge of the particulate filter, holding it securely and providing a leak-free edge seal. A suitable filter medium is a Filtrete™ brand filter from 3M Company, St. Paul, Minn. Alternatively, the particulate filter may be located downstream to the sorbent filter.

After the filter element has been pressed into the sleeve to form an interference fit between the sleeve's inner surface 36 and filter element's peripheral surface 44, the sleeve edge is folded radially inward as shown, for example, in FIG. 3. This may be done by folding one point on the edge inward more than 90°, and while holding it there, doing the same around the sleeve's circumference until the whole edge springs into position against the sleeve's inner surface 36 (FIG. 2). The sleeve's folded edge 42 can press snugly against filter element's inflow surface 43 to prevent inhaled air from channeling around the filter element's peripheral surface 44, in addition to maintaining the interference fit between the filter element and the sleeve's inner surface.

The sleeve may be an integral part of the face piece (i.e., formed as a single part and not attached thereto), or it may be part of a replaceable filter cartridge that is releasably attached to the respirator face mask. In a preferred embodiment, the sleeve and bonded filter element are part of a replaceable cartridge that has a snap fit attachment device that allows the filter cartridge to snap onto a mating part on the respirator face piece as taught in U.S. Pat. No. 5,579,761. The disclosure of this patent is incorporated here by reference.

Although the respirator and filter cartridge illustrated in the drawings employs a filter element that is circular in shape, it may be possible in other embodiments of the invention to use a filter element that has an alternative shape. For example, the filter element could be elliptical, oval, or otherwise curved. Configurations that employ sharp corners are to be avoided because channeling of inhaled gases is more likely to occur at the corners. When a non-circular filter element is employed, the sleeve has a circumference that is slightly less than the circumference of the bonded sorbent filter element to allow an interference fit to be achieved. Because the sleeve is slightly tapered, the circumference decreases along a line parallel to the sleeve's axis in the direction of the sleeve's base.

In this invention, however, it is not necessary to employ a tapered sleeve to create an interference between the filter element and the filter cartridge's sleeve. For example, a non-tapered sleeve could be used with a filter element that has a tapered peripheral surface. Or, a non-tapered sleeve could be used with a non-tapered filter element that has a circumference that is slightly larger than the circumference of the sleeve's inner surface. Other examples of press-fit filter elements are illustrated in U.S. Pat. No. 6,216,693. The disclosure of this patent is incorporated here by reference. The circumference of the sleeve's inner surface where it compresses upon the bonded sorbent filter element generally is less than the circumference of a non-compressed bonded sorbent filter element but is not more than 10 percent less, preferably not more than 5 percent less, and more preferably not more than 2 percent less, than the circumference of the filter element's peripheral surface in a non-compressed condition.

Respirators incorporating filter cartridges of the invention may be used for protecting persons against toxic gases or vapors. The primary categories of toxic gas or vapor filters are those for organic vapors, acid gases (including hydrogen chloride, sulfur dioxide, chlorine, hydrogen sulfide, chlorine dioxide, et. al.), ammonia or methylamine, formaldehyde, mercury vapor, and radioiodine compounds.

The following Example has been selected merely to further illustrate features, advantages, and other details of the invention. It is to be expressly understood, however, that while the Example serves this purpose, the particular ingredients and amounts used as well as other conditions and details are not to be construed in a manner that would unduly limit the scope of this invention.

EXAMPLE

Sample Preparation

A filter cartridge was constructed by first making the bonded carbon structures according to the following procedure. Kuraray GG activated carbon with US Standard mesh size of 12×20 (1.68 mm×.84 mm) was mixed in a thermal process with a thermoplastic polyurethane resin, Morthane™ PS455-100 (Morton Thiokol Company), the latter of which was reduced to powder form by grinding the polymer and then collecting the portion that would pass through a US standard 50 mesh screen (297 micrometers). The range in size of the resulting polymer powder was approximately 37–297 microns with a mean particle diameter (MPD) of approximately 150 microns.

The carbon granules comprised about 86 percent or 18.5 grams by weight of the resulting mixture. A custom built machine was then employed to assist in the molding of a bonded carbon structure using the carbon/polymer mix and a 76.5 cm diameter nonwoven polyester scrim material such as Remay 2250, (Remay Company, Old Hickory, Tenn.). At the first station of the machine, the nonwoven scrim was placed in a circular mold of 7.77 cm diameter and approximately 3.81 cm deep. After the scrim was placed in the bottom of the mold, the mold was transferred to the next station where 21.5 grams of the carbon/polymer mix was added to the mold by pouring it through a series of screens. The series of screens were designed to control the manner in which the mix fills the mold; the result of which was a mold filled in a level fashion. Once the mixture was in the mold and leveled, the material was heated to the melting point of the polymer binder particles. After heating, the mixture was compressed into its final shape, and the filter element was cooled to room temperature.

The resulting structure was a unitary bonded sorbent filter element having a nonwoven scrim on one of the flat faces of the cylinder. The bonded sorbent filter element had an outside diameter of 78 millimeters (mm) and a depth of 10.2 mm.

To assemble the cartridge the bonded sorbent filter element was fit into an injected molded sleeve. The sleeve was molded using high-density polyethylene Dow 8454. The sleeve's inside surface was tapered slightly at a draft of about 2 degrees to provide an interference fit between the bonded sorbent filter element and the sleeve wall. The diameter at the base of the inside of the sleeve is 77.6 mm; thus, providing an interference of 0.4 mm.

Once the bonded filter was fit into place in the sleeve, a 79.7 mm diameter particulate filter cut from a Filtrete™ brand filter and was placed on top of the bonded sorbent filter element. The basis weight of the particulate filter was nominally 200 $g/m^2$. With the two filter elements in place in the sleeve, the assembly was placed in the crimping device which folds the plastic wall at the hinge point radially inward until it springs into position against the inside wall of the sleeve. During this operation, the particulate filter was captured about its edge as the sleeve's folded edge was forced into position against the sleeve's inner surface. With the folded edge in place, a secure hold was established between the filter element and sleeve.

Test Procedure

The filter cartridge was prepared for testing by attaching the cartridge to an injection molded test mount. The cartridge was attached using a snap-fit attachment between the cartridge and the mount. The test mount was molded out of Amoco 3234 polypropylene (Amoco Chemical Company, Chicago, Ill.). The snap attachment provided a hermetic seal between the cartridge and the test mount as a result of the interference between the connecting members at the line of contact. The test mount was sealed to a flat plate with a central orifice of 2.0 cm which in turn was attached to a tapered fitting. The tapered fitting provided an air tight seal, as well as easy placement and removal of the test fixture from the test chamber. The cartridges when tested for gas and vapor performance were subjected to an air flow of 30 liters per minute (lpm), containing 50 percent relative humidity air and 300 parts per million (ppm) $CCl_4$. An air stream of such conditions is typical for testing industrial half mask respirators and in particular is representative of the conditions required by the Ministry of Labor in Japan (Standards for Gas Mask, Notice number 68 of Ministry of Labor, (1990)). As the cartridge was being challenged with 300 ppm $CCl_4$ in air, the effluent was monitored by a Miran 103 gas analyzer for breakthrough of $CCl_4$. The time between time zero and the time it takes for the effluent to reach 5 ppm of $CCl_4$ is referred to as the service life of the cartridge. A minimum service life of 50 minutes is required by the Japanese Ministry of Labor.

In the case of the particulate penetration test, the cartridges were attached to the test mount as described above, and the cartridge assembly was challenged with a 95 lpm flow of NaCl particles at a concentration of 12 milligrams per cubic meter. The effluent was monitored with a TSI Model 8110 (Thermal Systems Inc.) particle generator and counter. The Model 8110 generates the NaCl particle challenge and then measures and computes the percent penetration of the NaCl aerosol.

The test results are set forth below in Table 1.

TABLE 1

| Sample Number | Percent Penetration | Sample Number | Service Life (Minutes) |
|---|---|---|---|
| 1 | 2.01 | 4 | 67 |
| 2 | 2.09 | 5 | 74 |
| 3 | 0.94 | 6 | 68 |

The data in Table 1 demonstrate that low penetration values were achieved with this cartridge, indicating that the folded edge is preventing fluid from channeling between the filter element and the cartridge sleeve. The data also demonstrate that the service life exceeds the standard required by the Japanese Ministry of Labor.

What is claimed is:

1. A filter cartridge that comprises:

(a) a housing that includes a sleeve that has an inner surface and has a folded edge extending from the sleeve; and (b) a filter element that includes a bonded sorbent filter element, the filter element being compressed by the sleeve's inner surface to form an interference therewith and is held in the sleeve by the folded edge.

2. The filter cartridge of claim 1, wherein the filter element includes a particulate filter that is located on the upstream side of the bonded sorbent filter element.

3. The filter cartridge of claim 1, wherein the sleeve has a tapered inner surface.

4. The filter cartridge of claim 3, wherein the sleeve has an inside diameter that is slightly larger than an outer diameter of the bonded sorbent filter element, the sleeve's inside diameter decreasing along a line that proceeds axially towards a rear surface of the housing, wherein the sleeve's inside diameter at some point in proceeding axially toward the rear surface is slightly less than the outside diameter of the bonded sorbent filter element.

5. The filter cartridge of claim 1, wherein the filter element has a tapered peripheral surface.

6. The filter element of claim 1, wherein the sleeve has an annular groove of decreased wall thickness to define a fold line about which the folded edge is formed.

7. The filter cartridge of claim 6, wherein the sleeve is folded radially inward to provide the folded edge.

8. The filter cartridge of claim 1, wherein the sleeve is made from a polymeric material that has a flexural modulus of $2\times10^8$ and to $30\times10^8$ pascals at 22° C.

9. The filter cartridge of claim 8, wherein the sleeve's polymeric material has a flexural modulus of $6\times10^8$ to $15\times10^8$ pascals at 22° C.

10. The filter cartridge of claim 1, wherein the sleeve's inner surface is tapered at a draft of 0.5 to 5 degrees.

11. The filter cartridge of claim 10, wherein the sleeve's inner diameter at a base of the housing is 0.1 to 0.8 millimeters less than a diameter of the filter element.

12. The filter cartridge of claim 11, wherein the circumference of the sleeve's inner surface is not more than 2 percent less than of the circumference of the bonded sorbent filter element in the non-compressed condition.

13. The respirator of claim 1, wherein the filter element has a curved configuration about its periphery and lacks any sharp corners.

14. The filter cartridge of claim 1, wherein the sleeve's inner surface has a circumference, where the sleeve compresses upon the bonded sorbent filter element, that is less than the circumference of a non-compressed bonded sorbent filter element but is not more than 10 percent less than the circumference of the non-compressed bonded sorbent filter element.

15. The filter cartridge of claim 14, wherein the circumference of the sleeve's inner surface is not more than 5 percent less than the circumference of the bonded sorbent filter element in the non-compressed condition.

16. A respirator that comprises:

(a) a face piece sized to fit at least over the nose and mouth of a person;

(b) a filter cartridge secured to the face piece that comprises:

(i) a housing that includes a sleeve that has an inner surface and has a folded edge extending from the sleeve; and (ii) a filter element that includes a bonded sorbent filter element, the filter element being compressed by the sleeve's inner surface to form an interference therewith and is held in the sleeve by the folded edge.

* * * * *